United States Patent [19]

Paziaud

[11] 4,172,012

[45] Oct. 23, 1979

[54] PROCESS AND APPARATUS FOR THE DETECTION AND PRELOCALIZATION OF A CAN FRACTURE IN A FUEL ASSEMBLY OF A FAST NUCLEAR REACTOR

[75] Inventor: Alain Paziaud, Gif sur Yvette, France

[73] Assignee: Commissariat a l'Energie Atomique, Paris, France

[21] Appl. No.: 803,882

[22] Filed: Jun. 6, 1977

[30] Foreign Application Priority Data

Jun. 23, 1976 [FR] France .............................. 76 19104

[51] Int. Cl.² ........................................... G21C 17/00
[52] U.S. Cl. .............................................. 176/19 LD
[58] Field of Search ........................... 176/19, 40, 65

[56] References Cited

U.S. PATENT DOCUMENTS

| 3,050,624 | 8/1962 | Janner | 176/19 R |
| 3,354,040 | 10/1967 | Frame et al. | 176/19 R |
| 3,400,046 | 9/1968 | Barker | 176/40 |
| 3,612,860 | 10/1971 | Hackney | 176/19 LD |
| 3,719,556 | 3/1973 | Snyder, Jr. et al. | 176/40 |
| 3,932,211 | 1/1976 | Loving, Jr. | 176/19 R |
| 3,962,032 | 6/1976 | Bernjolles et al. | 176/40 |

FOREIGN PATENT DOCUMENTS

| 2162522 | 8/1973 | France | 176/19 R |
| 1132357 | 10/1968 | United Kingdom | 176/19 D |

OTHER PUBLICATIONS

Fast Reactor Technology: Plant Design, Yevick et al.; M.I.T. Press (1966), pp. 638, 640-642.

*Primary Examiner*—Samuel W. Engle
*Assistant Examiner*—S. A. Cangialosi
*Attorney, Agent, or Firm*—Lane, Aitken & Ziems

[57] ABSTRACT

Process and apparatus for the detection and prelocalization of a can fracture in a fuel assembly of a fast nuclear reactor.

The device comprises at least one detector for the neutrons emitted by the fission products transported in the outflow of cooling agent as the result of the fracture of a can, said detector being immersed within the vessel in the outflow of cooling agent in an area protected from neutrons emitted by the core by the volume of cooling agent and by structures immersed in the annular space between the core and the vessel.

8 Claims, 1 Drawing Figure

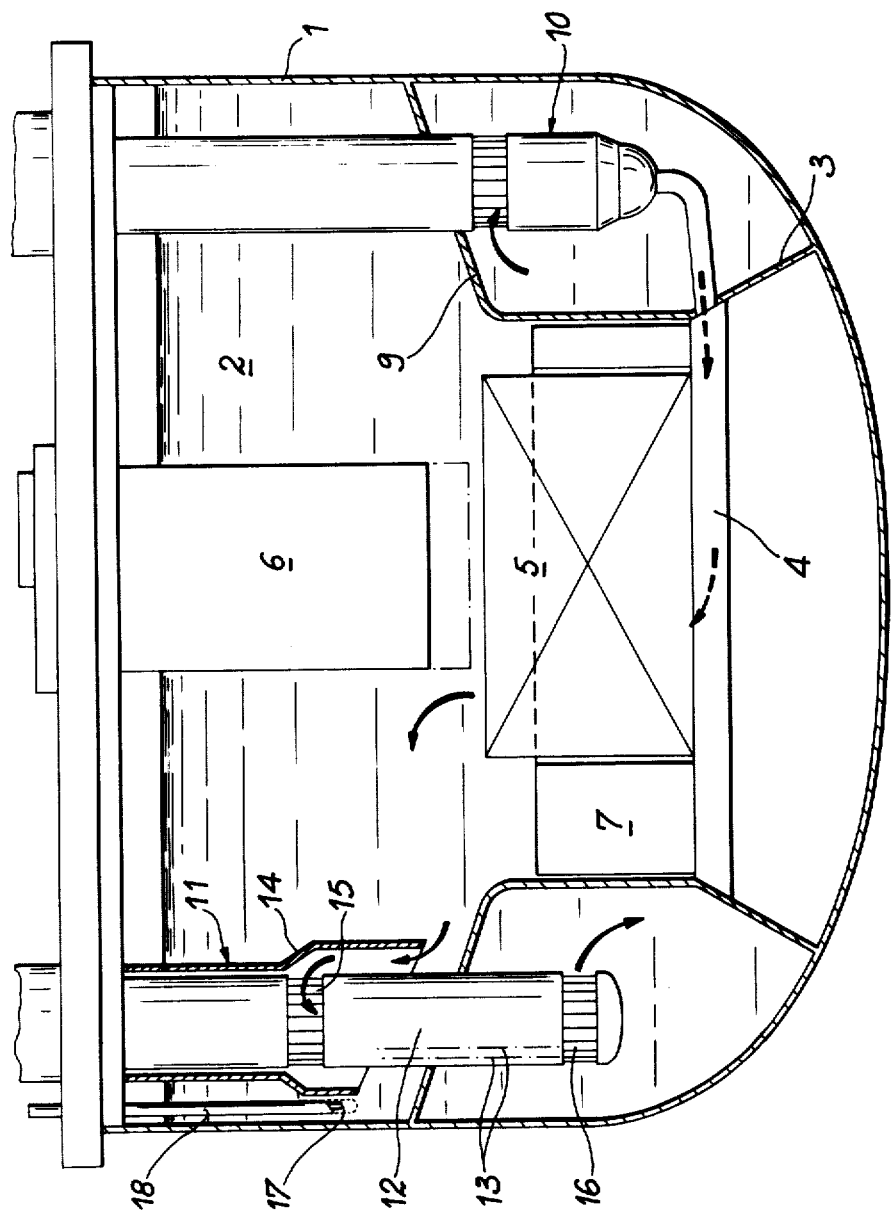

PROCESS AND APPARATUS FOR THE DETECTION AND PRELOCALIZATION OF A CAN FRACTURE IN A FUEL ASSEMBLY OF A FAST NUCLEAR REACTOR

BACKGROUND OF THE INVENTION

The present invention relates to a process and to an apparatus permitting the detection and prelocalization of the fracture of a can in a fuel assembly of a fast nuclear reactor cooled by the circulation of a liquid metal, generally sodium, by counting the delayed neutrons emitted by the fission products escaping from the defective assembly and located by the liquid metal.

Provisions have already been made for carrying out a measurement of delayed neutrons due to fission products released as a result of the fracture of a can by passing all or part of the cooling agent flow within the vessel as close as possible to a neutron detector, which is itself located externally of the latter. Neutrons emitted by fission products with a certain delay compared with the initial nuclear reaction in the core therefore have, at the time where they pass in the vicinity of the detector, a harder energy spectrum than that of the neutrons produced in the core. Thus, their detection can be ensured under more reliable and effective measuring conditions making it possible to carry out the necessary interventions on the defective assembly within a shorter period of time.

BRIEF SUMMARY OF THE INVENTION

The present invention relates to a process and to an apparatus which make it possible to considerably increase the sensitivity of detection of neutrons emitted by fission products. This sensitivity is in fact improved for the following reasons:

In all directions the neutron detector is surrounded by the cooling agent carrying the fission products. Absorption of neutrons is decreased, more particularly due to passing through the wall of the vessel. The neutrons are measured throughout the spectrum and not only in the area of the neutrons thermalised by passing through retarding materials.

To this end, the process comprises performing a direct measurement of the delayed neutrons in the outflow of cooling agent from the reactor within the actual vessel containing said cooling agent.

For the performance of this process, the invention also relates to a special measuring device which comprises at least one detector for the neutrons emitted by the fission products transported in the outflow of cooling agent as the result of the fracture of a can, said detector being immersed within the vessel in the outflow of cooling agent in an area protected from neutrons emitted by the core by the volume of cooling agent and by structures immersed in the annular space between the core and the vessel.

Preferably, the neutron detector comprises a U 235 fission chamber mounted within a gloove finger submerged in the cooling agent.

In the conventional solution for a fast nuclear reactor, called the integrated solution where the reactor vessel contains in addition to the core primary exchangers and circulating pumps distributed around said core, the exchangers having a group of exchange tubes, a sheath surrounding said group and at least one ferrule arranged around ports for the entry of cooling agent into the sheath, the neutron detector is mounted between the ferrule of the exchanger and the inner wall of the vessel.

In a preferred embodiment, each exchanger is associated within the vessel with three detectors regularly spaced around the exchanger on a circular arc.

According to other variants, the detectors are placed in the upper portion of the group of tubes level with the cooling agent entry ports or are applied against the inner wall of the main vessel or are finally positioned above the entry ports.

BRIEF DESCRIPTION OF THE DRAWINGS

Other features of the present invention can be gathered from the following description of a non-limitative embodiment with reference to the attached drawings which schematically shows a cross-section of a fast nuclear reactor, equipped with delayed neutron detectors of the type described hereinbefore.

DETAILED DESCRIPTION OF THE PREFERRED EMBODIMENTS

In the drawing, reference numeral 1 designates the vessel of a fast nuclear reactor, intended more particularly to contain a volume 2 of a liquid cooling metal, generally sodium. The base of vessel 1 supports a supporting structure 3 for a cross-member 4 on which rests the core 5 of the reactor. This core is completely immersed in sodium volume 2 and is surmounted by a core cover 6 carrying a series of measuring devices and instruments necessary for the operation of the installation. Core 5 is laterally surrounded by a protective structure 7, vessel 1 being separated into two portions by bend 9 of an inner vessel separating sodium volume 2 into two zones.

According to a conventional arrangement, the reactor has circulating pumps 10 and heat exchangers 11 distributed around the core 5 in said vessel and permitting the sodium volume which leaves the core and which is collected in the inner vessel to traverse the exchangers and leave the same in the space between the two vessels where it is then taken up by pumps 10 which finally return it beneath cross-member 4 for a new passage through the core.

Each exchanger 11 comprises a cylindrical sheath 12, having a vertical axis, containing a group of exchange tubes 13, said sheath 12 being itself surrounded in its upper portion by a ferrule 14. Sheath 12 has entry ports 15, which permit the sodium leaving the core in the direction of the arrows to penetrate the exchanger in order to come into contact with the group of exchange tubes 13, whereby, once cooled this sodium leaves the exchanger via ports 16 located beneath the bend 9 of the inner vessel.

According to the invention, the delayed neutrons emitted by the fission product entrained by the sodium circulating in the vessel as a result of a fracture of the can of a fuel assembly in the core are measured by means of at least one detector 17 mounted within tubes 18 in the form of a gloove finger submerged below the level of the sodium. These detectors 17 are arranged in a region of vessel 1 where they are protected from the direct radiation of neutrons from the core. This, the gloove fingers 18 containing said detectors can be placed either directly against the inner wall of the vessel 1 or within the sheath 12 of the exchanger among the group 13 of exchange tubes, or against the ferrule 14 or above ports 15, said different assembly arrangements can be adopted among others in view of the fact that they utilise at least partly the protection given by the actual exchanger relative to the neutrons from the core. Moreover, the device according to the invention can have one or more detectors suitably distributed around the exchanger. Thus, it is possible to arrange around each exchanger 11 three detectors such as 17 regularly spaced about the exchanger on a circular arc. Thus, a signal is obtained on the detectors which will vary as a function of the location of the can fracture in the core, thus permitting a prelocalization of the portion of said fracture. Advantageously, the detectors used are constituted by fission chambers, more particularly U 235 cylindrical chambers having a positive axial electrode and a uranium deposit of limited thickness, arranged against the inner wall of the detector chamber, the latter being filled by an atmosphere of neutral gas, for example argon or helium.

The present invention is not limited to the embodiments described and represented hereinbefore and various modifications are possible thereto without passing beyond the scope of the invention.

What is claimed is:

1. A process for the detection and prelocalization of a fracture of a can in a fast nuclear reactor having a core comprising performing a direct measurement with a detector means of the delayed neutrons in the outflowing sodium cooling agent from the core, said detector means being immersed in said sodium cooling agent and positioned within a tank type vessel containing the core and said sodium cooling agent and protected from the core by the mass of said sodium cooling agent and by shielding provided by other apparatus, including a heat exchanger which includes a group of exchange tubes, a sheath surrounding said group of exchange tubes, and a ferrule arranged to constitute an intake port for entry of said sodium cooling agent into said sheath, interpositioned between said detector means and the core.

2. A device for detecting and prelocalizing a fracture of a can in a fast nuclear reactor having a core comprising means for detecting delayed neutrons emitted by the fission products transported in the outflow of a sodium cooling agent as the result of the fracture of a can, said detector means being immersed in the outflow of said sodium cooling agent in a tank type vessel containing the core and said sodium cooling agent in an area protected from neutrons emitted by the core by the volume of said sodium cooling agent and by other apparatus, including a primary heat exchanger which includes a group of exchange tubes, a sheath surrounding said group of exchange tubes, and a ferrule arranged to constitute an intake port for entry of said sodium cooling agent into said sheath, interpositioned between said detecting means and the core, said detector means further being positioned in an annular space between the core and the inner wall of said tank type vessel, said tank type vessel further containing a plurality of primary heat exchangers and circulating pumps distributed about the core, each of said exchangers comprising a group of exchange tubes, a sheath surrounding said group, and at least one ferrule arranged to constitute an intake port for entry of said sodium cooling agent into said sheath.

3. A device according to claim 2 wherein said detector means comprises a U 235 fission chamber mounted within a gloove finger.

4. A device according to claim 2 comprising three of said detector means and wherein three of said detector means are associated with one of said exchangers within said vessel and regularly spaced around said exchanger over a circular arc.

5. A device according to claim 2 comprising a plurality of said detector means and wherein each of said detector means is positioned at a level corresponding to the upper part of a group of tubes and an intake port.

6. A device according to claim 2 comprising a plurality of said detector means and wherein each of said detector means is positioned against an inner wall of said vessel.

7. A device according to claim 2 comprising a plurality of said detector means and wherein each of said detector means is positioned at a level above said intake ports.

8. A device according to claim 2 comprising a plurality of said detector means.

* * * * *